(12) United States Patent
Xiong et al.

(10) Patent No.: US 11,947,220 B2
(45) Date of Patent: Apr. 2, 2024

(54) QUANTUM DOT LIGHT GUIDE MODULE, MANUFACTURING METHOD, AND BACKLIGHT MODULE

(71) Applicant: ShenZhen YunMiXin Display Technology Co., Ltd, Guangdong (CN)

(72) Inventors: Chong Xiong, Guangdong (CN); Chang'ao Liu, Guangdong (CN)

(73) Assignee: SHENZHEN YUNMIXIN DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/319,467

(22) Filed: May 17, 2023

(65) Prior Publication Data
US 2023/0296940 A1 Sep. 21, 2023

(30) Foreign Application Priority Data
Nov. 10, 2022 (CN) .......................... 202211410655.7

(51) Int. Cl.
  *G02F 1/00* (2006.01)
  *G02F 1/1335* (2006.01)
  *G02F 1/13357* (2006.01)

(52) U.S. Cl.
  CPC .. *G02F 1/133614* (2021.01); *G02F 1/133603* (2013.01); *G02F 2202/28* (2013.01)

(58) Field of Classification Search
  CPC ......... G02F 1/133614; G02F 1/133603; G02F 2202/28
  See application file for complete search history.

(56) References Cited

U.S. PATENT DOCUMENTS

| | | | | |
|---|---|---|---|---|
| 2016/0097889 A1* | 4/2016 | Kim | ....................... | G02B 6/005 362/606 |
| 2017/0269432 A1* | 9/2017 | Lee | .................... | G02F 1/133609 |
| 2018/0045574 A1* | 2/2018 | Engelbart | ............. | G01J 5/0066 |
| 2019/0094616 A1* | 3/2019 | Kim | ....................... | G02B 6/0051 |

FOREIGN PATENT DOCUMENTS

CN 114497429 A 5/2022

* cited by examiner

*Primary Examiner* — Gerald J Sufleta, II
(74) *Attorney, Agent, or Firm* — SHIMOKAJI IP

(57) ABSTRACT

A quantum dot light guide module includes a transparent substrate and a transparent cover plate. The transparent substrate has a first groove, an inner wall of the first groove is a rough surface, and the first groove is provided with a quantum dot layer formed by curing a quantum dot paste. The transparent cover plate covers on a surface of the transparent substrate where the first groove is configured, a sealing adhesive layer is provided between the transparent cover plate and the transparent substrate, and the transparent cover plate is connected with the transparent substrate through the sealing adhesive layer and covered the first groove. In such a way, water vapor and oxygen are effectively isolated and the failure problem of the quantum dot layer is avoided, and the quantum dot layer is distributed uniformly in the first groove.

2 Claims, 7 Drawing Sheets

QUANTUM DOT LIGHT GUIDE MODULE, MANUFACTURING METHOD, AND BACKLIGHT MODULE

FIELD OF THE INVENTION

The present application relates to the technical field of liquid crystal display, in particular to a quantum dot light guide module, a manufacturing method thereof and a backlight module.

BACKGROUND OF THE INVENTION

A liquid crystal display (LCD) requires a backlight system to provide uniform light source, and the backlight system generally adopts the scheme of blue light panel and quantum dot (QD) films. The blue light emitted through the blue light panel passes through the QD films. The green QD material in the QD films will absorb blue light and turn into green light, while the red QD material can absorb blue light and turn into red light. Therefore, the blue, red and green light may be mixed together to produce white light, which provides a backlight for LCD monitors. As known, a quantum dot film is generally formed by packaging QD material with two PET barrier films, while the QD material is sensitive to water and oxygen. The conventional QD films can meet the requirements of common products since the two PET barrier films may prevent water vapor and oxygen from entering the QD material to a certain extent, but is undesirable for some products with higher requirements, such as display devices on automobiles or outdoor products. The QD material may be ineffective or even failed to convert the color light, once the water vapor and oxygen contact with the QD material Therefore, it is necessary to develop a quantum dot light guide module and a manufacturing method thereof and a backlight module to solve the above problems.

SUMMARY OF THE INVENTION

The present invention aims to provide a quantum dot light guide module, a manufacturing method thereof and a backlight module, which can avoid water vapor and oxygen entering the quantum dot layer, and effectively avoid the failure problem of the quantum dot layer, and further make the cured quantum dot layer evenly spread in the first groove.

To achieve the above purpose, as a first aspect, the present invention provides a quantum dot light guide module, including:

a transparent substrate, having a first groove, wherein an inner wall of the first groove is a rough surface, and the first groove is provided with a quantum dot layer formed by curing a quantum dot paste; and a transparent cover plate, covering on a surface of the transparent substrate where the first groove is configured, wherein a sealing adhesive layer is provided between the transparent cover plate and the transparent substrate, and the transparent cover plate is connected with the transparent substrate through the sealing adhesive layer and covered the first groove.

Optionally, a second groove is provided at one side of the transparent cover plate facing towards the transparent substrate, the second groove is located at a position corresponding to the first groove, and the second groove is provided with a diffusion layer for diffusing incoming light in all directions.

Optionally, a second groove is provided at one side of the transparent cover plate facing towards the transparent substrate, the second groove is located at a position corresponding to the first groove, and the second groove is provided with a selective reflection layer for only reflecting a part of a first color light configured to excite a quantum dot.

Optionally, a second groove is provided at one side of the transparent cover plate facing towards the transparent substrate, the second groove is located at a position corresponding to the first groove, the second groove is provided with a diffusion layer for diffusing incoming light in all directions, and a selective reflection layer is arranged between the diffusion layer and a bottom wall of the second groove for only reflecting a part of a first color light configured to excite a quantum dot.

Optionally, the quantum dot layer includes a first quantum dot and a second quantum dot, a first color light is configured to excite the first quantum dot and the second quantum dot respectively to emit a second color light and a third color light, and the first color light, the second color light and the third color light are mixed into white light.

To achieve the above purpose, as a second aspect, the present invention provides a manufacturing method of a quantum dot light guide module, including:

providing a transparent substrate and a transparent cover plate;

forming a first groove on one surface of the transparent substrate;

roughening an inner wall of the first groove to form a rough surface;

placing a quantum dot paste into the first groove, the quantum dot paste including UV adhesive;

bonding the transparent cover plate to the transparent substrate so that the transparent cover plate covers the first groove of the transparent substrate; and curing the quantum dot paste by UV light after bonding the transparent cover plate with the transparent substrate.

Optionally, before bonding the transparent cover plate to the transparent substrate so that the transparent cover plate covers the first groove of the transparent substrate, the method further includes:

forming a second groove on a surface of the transparent cover plate which is to be covered the transparent substrate, so that the second groove is located at the position corresponding the first groove; and coating a film on a bottom wall of the second groove to form a selective reflection layer.

Optionally, after coating a film on a bottom wall of the second groove to form a selective reflection layer, the method further includes:

placing a diffused particle paste in the second groove.

To achieve the above purpose, as a third aspect, the present invention provides a backlight module, including the quantum dot light guide module mentioned above and a light-emitting substrate, wherein a front surface of the light-emitting substrate is provided with a LED chip corresponding to a position of the first groove, and the front surface of the light-emitting substrate is faced towards a surface of the transparent substrate without the first groove, and the LED chip is configured to emit a first color light.

Optionally, the light-emitting substrate is provided with reflective retaining walls arranged around each LED chip, each region circled by each reflective retaining wall has identical area and shape; when the first color light emitted from the LED chip reaches to the reflective retaining walls, the first color light will be reflected by the reflective retaining walls.

In comparison with the prior art, the first groove is configured on the transparent substrate and the quantum dot paste in the first groove is cured to form the quantum dot layer, further, the transparent cover plate is connected with the transparent substrate through the sealing adhesive layer and covered the first groove, thus the quantum dot light guide module according to the present invention can effectively isolate water vapor and oxygen and avoid the failure problem of the quantum dot layer. In addition, a rough surface is formed on the inner wall of the first groove of the transparent substrate, so that the quantum dot paste contacting with the rough surface will not be in water drops generated due to high surface tension, therefore the quantum dot paste can fully contact with the rough surface, which facilitates the cured quantum dot layer to uniformly spread on the first groove.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

In order to make the purpose, technical solutions and advantages of the present application more clearly understood, the present application will be described in further detail below with reference to the accompanying drawings and embodiments.

Figure 1:
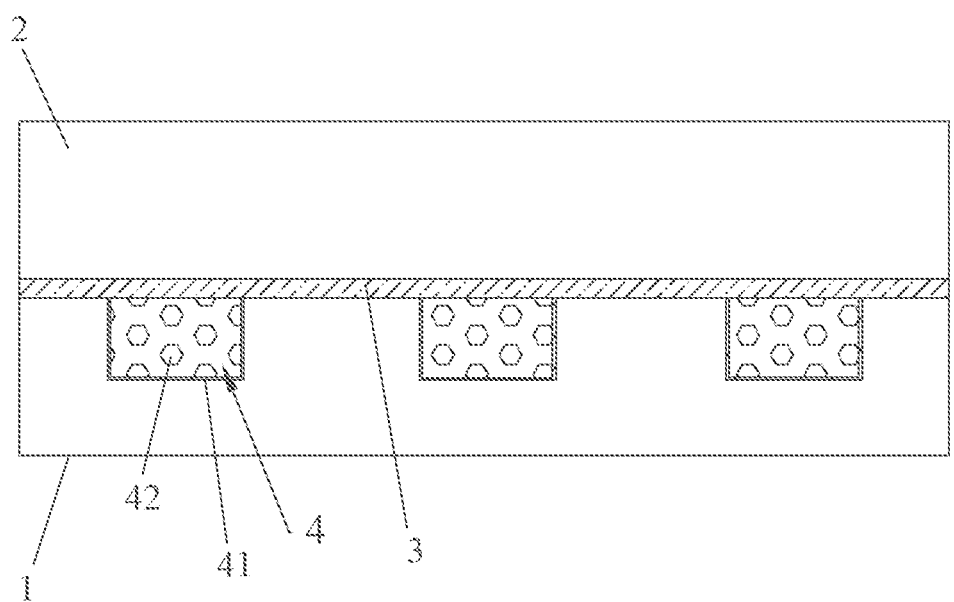
FIG. 1 is a schematic diagram of a quantum dot light guide module according to an embodiment of the present invention.

Referring to FIG. 1, the present invention provides a quantum dot light guide module, including a transparent substrate 1 and a transparent cover plate 2. Specifically, the transparent substrate 1 is provided with a first groove 2, an inner wall of the first groove 2 is a rough surface 41, and the first groove 2 is provided with a quantum dot layer 42 formed by curing a quantum dot paste. The transparent cover plate 2 is covered on a surface of the transparent substrate 1 where is provided with the first groove 4. A sealing adhesive layer 3 is provided between the transparent cover plate 2 and the transparent substrate 1, and the transparent cover plate 2 is connected with the transparent substrate 1 through the sealing adhesive layer and covered the first groove 4.

In the present invention, the first groove 4 is configured on the transparent substrate 1 and the quantum dot paste in the first groove 4 is cured to form the quantum dot layer 42, further, the transparent cover plate 2 is connected with the transparent substrate 1 through the sealing adhesive layer and covered the first groove 4, thus the quantum dot light guide module according to the present invention can effectively isolate water vapor and oxygen and avoid the failure problem of the quantum dot layer 42. In addition, a rough surface 41 is formed on the inner wall of the first groove 4 of the transparent substrate 1, so that the quantum dot paste contacting with the rough surface 41 will not be in water drops generated due to high surface tension, therefore the quantum dot paste can fully contact with the rough surface 41, which facilitates the cured quantum dot layer 42 to uniformly spread on the first groove 4.

It's understandable that, both of the transparent substrate 1 and the transparent cover plate 2 are plate-like structures, and made of materials having good light transmittance and reliable sealing. Preferably, glass materials may be used. In addition, the inner wall of the first groove 4 includes a bottom wall and side walls, and the rough surface 41 covers the entire walls of the first groove 4.

Specifically, the quantum dot layer 42 includes a first quantum dot and a second quantum dot. A first color light is configured to excite the first quantum dot and the second quantum dot respectively to emit a second color light and a third color light, and the first color light, the second color light and the third color light are mixed into white light.

Specifically, the first quantum dot may be red quantum dot, the second quantum dot may be green quantum dot, and the first color light may be blue light. Blue light can excite the first quantum dot to produce red light, namely the second color light, and also excite the second quantum dot to produce green light, namely the third color light; and the blue light, the green light and the red light are mixed to produce white light.

Specifically, the quantum dot paste includes the first quantum dot, the second quantum dot and a UV adhesive. The first quantum dot and the second quantum dot may be fixed in the first groove 4 by UV light curing.

It is understandable that, the sealing adhesive layer 3 between the transparent substrate 1 and the transparent cover plate 2 may be ordinary packaging glue, such as epoxy glue, as long as the transparent substrate 1 and transparent cover plate 2 can be bonded, and the material is transparent or semitransparent. Preferably, UV adhesive may be used and cured by UV light, so that the sealing of the quantum dot light guide module is more reliable.

In addition, in order to improve the light-emitting efficiency, the content of the quantum dot in the quantum dot layer 42 may be reduced. Preferably, the quantum dot paste may include diffusion particles which are configure for refracting and reflecting the incoming light many times, so that the first color light may excite the first quantum dot and the second quantum dot many times, which is conducive to reducing the cost while ensuring the light-emitting efficiency. However, it's difficult to evenly mix the diffused particles with the quantum dots, since the diffused particles are so different in diameter from the quantum dots. When cured by UV light, the diffused particles are stretched around the edges, resulting in uneven emitting colors.

Figure 2:
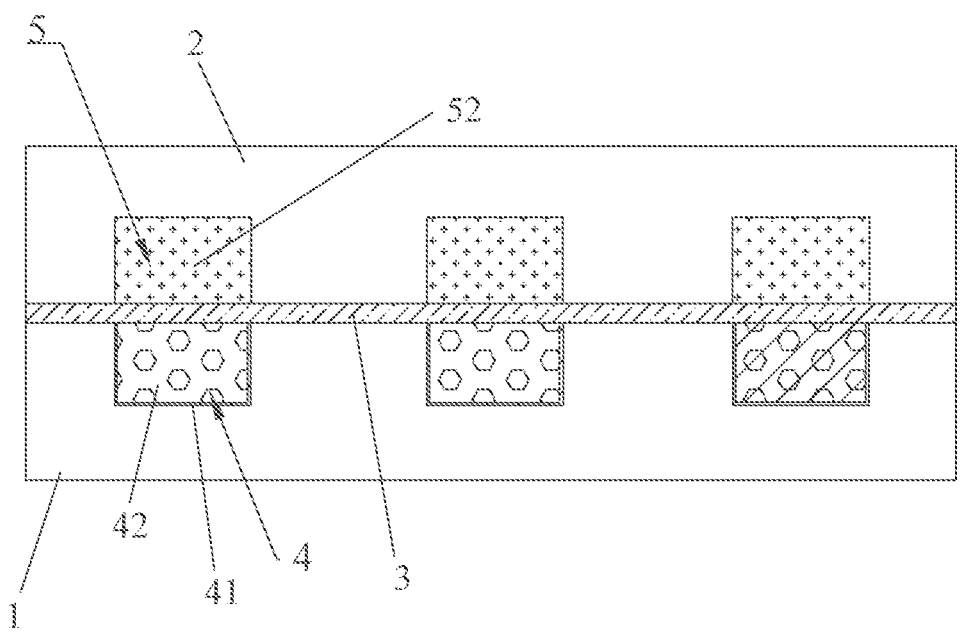
FIG. 2 is a schematic diagram of a quantum dot light guide module according to another embodiment of the present invention.

Referring to FIG. 2, in some embodiments, a second groove 5 is provided at one side of the transparent cover plate 2 facing towards the transparent substrate 1. The second groove 5 is located at the position corresponding to the first groove 4. The second groove 5 is provided with a diffusion layer 52 for diffusing the incoming light in all directions. The diffusion layer 52 may refract and reflect the incoming light and diffuse to all directions. When the first color light is reflected or refracted back to the quantum dot layer 42, the second and third quantum dots may be excited continually, thereby improving the light-emitting efficiency.

Based on the above configuration, the light-emitting efficiency can be improved and uneven emitting color can be avoided without doping diffusion particles in the quantum dot layer 42.

Specifically, the diffusion layer 52 includes diffusion particles, which may be silica, calcium carbonate and other materials. By adjusting the concentration of diffusion particles in the diffusion layer 52, the brightness consistency of the white light produced by the quantum dot light guide module according to the invention can be improved.

Figure 3:
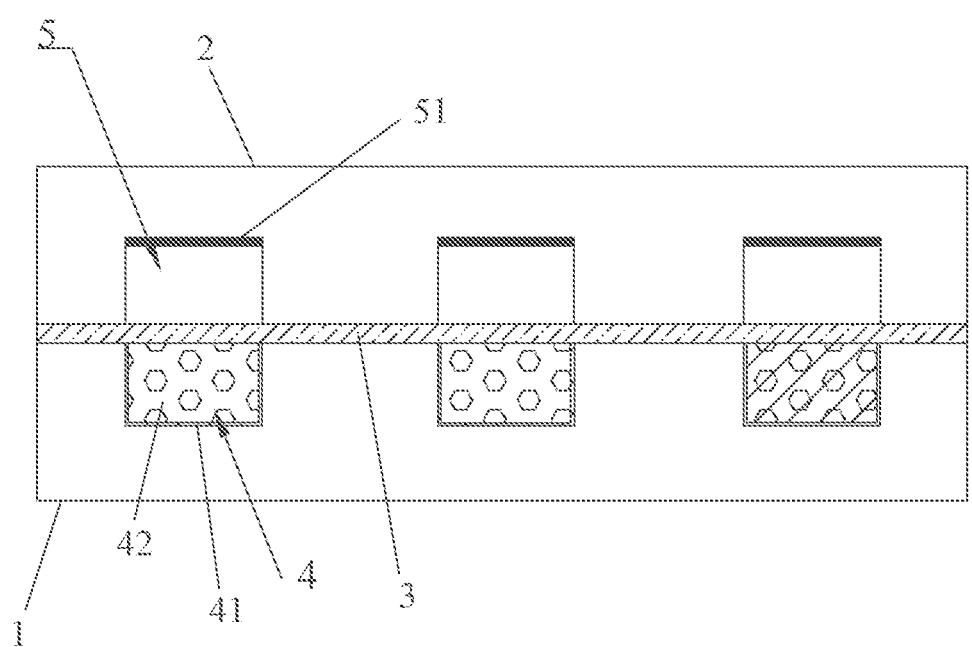
FIG. 3 is a schematic diagram of a quantum dot light guide module according to one more embodiment of the present invention.

Referring to FIG. 3, in some embodiments, a second groove 5 is provided at one side of the transparent cover plate 2 facing the transparent substrate 1. The second groove 5 is located at the position corresponding to the first groove 4. The second groove 5 is provided with a selective reflection layer 51 configured for only reflecting a part of the first color light configured to excite the quantum dot. The selective reflection layer 51 can reflect a part of the first color light back to the quantum dot layer 42, so that the reflected first color light will continue to excite the quantum dots, thereby improving the light-emitting efficiency. It's noted that the first color light is emitted by the light source, thus the redundant first color light may be fully reflected and utilized due to the existence of the selective reflection layer 51.

Referring to FIG. 3, in some embodiments, the selective reflection layer 51 is a blue light reflector, and the color consistency of the white light produced by the quantum dot light guide module of the invention can be adjusted and improved by adjusting the reflectivity of the selective reflection layer 51.

Specifically, the selective reflection layer 51 may be coated and formed by magnetron sputtering process, and may be formed by multiple film layers made of inorganic material, such as silicon dioxide and titanium dioxide, and the reflectivity thereof may be adjusted by controlling the thickness of the film layers.

Figure 4:
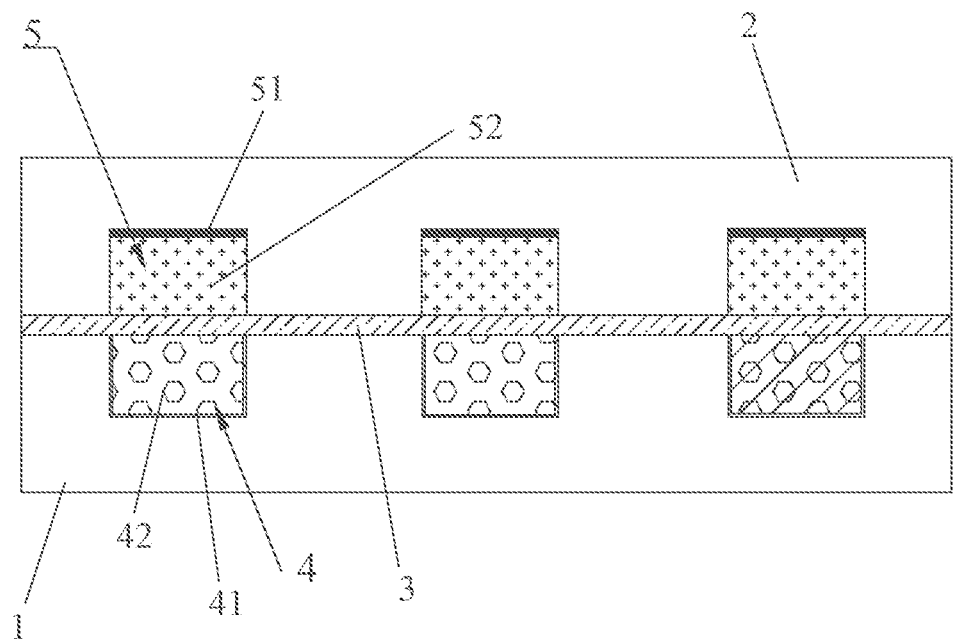
FIG. 4 is a schematic diagram of a quantum dot light guide module according to one more embodiment of the present invention.

Referring to FIG. 4, in some embodiments, a second groove 5 is provided at one side of the transparent cover plate 2 facing the transparent substrate 1. The second groove 5 is located at the position corresponding to the first groove 4. The second groove 5 is provided with a diffusion layer 52 for diffusing the incoming light in all directions. Further, a selective reflection layer 51 is arranged between the diffusion layer 51 and a bottom wall of the second groove 5 for only reflecting a part of the first color light configured to excite the quantum dots. By configuring the diffusion layer 52 and the selective reflection layer 51 at the same time, the first color light can be adjusted twice to improve the light-emitting efficiency. Moreover, the color consistency and brightness consistency of the produced white light can be adjusted respectively by adjusting the concentration of the diffused particles in the diffusion layer 52 and the reflectivity of the selective reflection layer 51.

Figure 5:
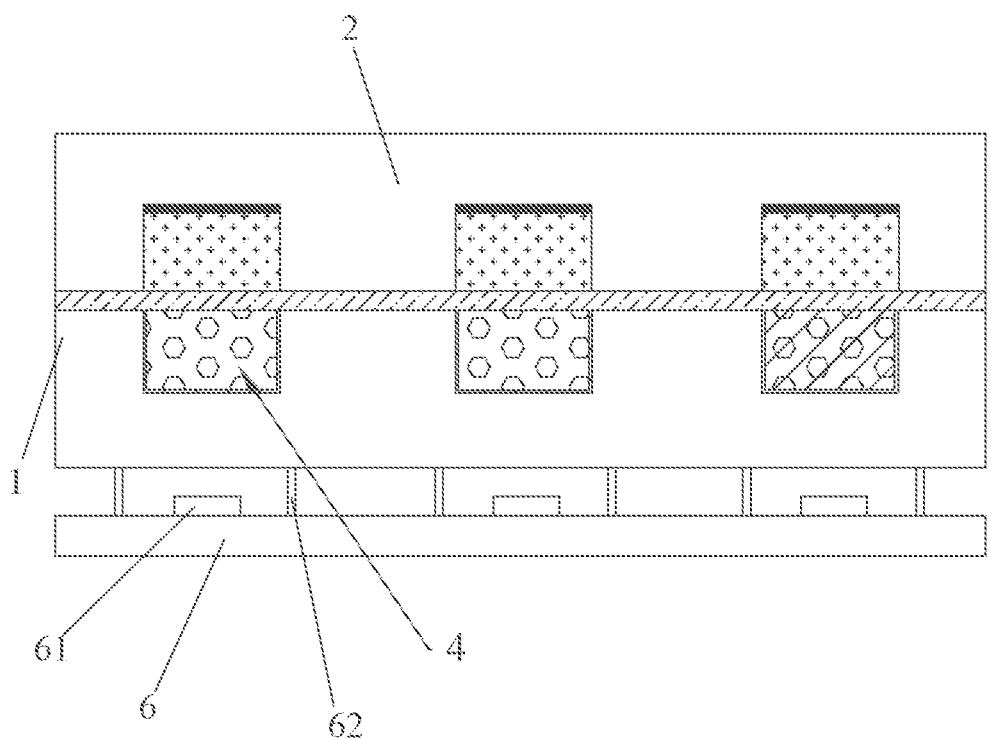
FIG. 5 is a schematic diagram of a backlight module according to an embodiment of the present invention.

Referring to FIG. 5, the present invention also provides a backlight module, including the quantum dot light guide module mentioned above and a light-emitting substrate 6. The front surface of the light-emitting substrate 6 is provided with a LED chip 61 corresponding to the position of the first groove 4, and the front surface of the light-emitting substrate 6 is faced towards the surface of the transparent substrate 1 without the first groove 4. The LED chip 61 is configured to emit the first color light.

Specifically, the LED chip 61 is a blue LED chip. The light emitted by the LED chip 61 passes through the first groove 4 to excite the quantum dots in the quantum dot layer 42, and the LED chip 61 is served as the light source.

Referring to FIG. 5, further, the light-emitting substrate 6 is provided with reflective retaining walls 62 arranged around each LED chip 61. The area and the shape of the region circled by each reflective retaining wall 62 is substantially the same. When the first color light emitted from the LED chip 61 reaches to the reflective retaining walls 62, the corresponding first color light will be reflected by the reflective retaining walls 62. Therefore, the first color light emitted from the LED chip 62 will not enter into the lighting area of the adjacent LED chip 61 due to the existence of the reflective retaining walls 62, which avoids uneven emitting brightness at the edge area and other areas. On the contrary, in the case of without reflective retaining walls 62, for the three LED chips 61 located adjacently, the lighting area of the LED chip 61 in the middle may receive the light emitted by two adjacent LED chips 61, resulting in uneven brightness and color.

It's understandable that, the reflective retaining walls 62 may be formed from reflective white solid glue. In addition, the thickness of the reflective retaining walls 62 can be the distance from the light-emitting substrate 6 to the transparent substrate 1.

Figure 6:
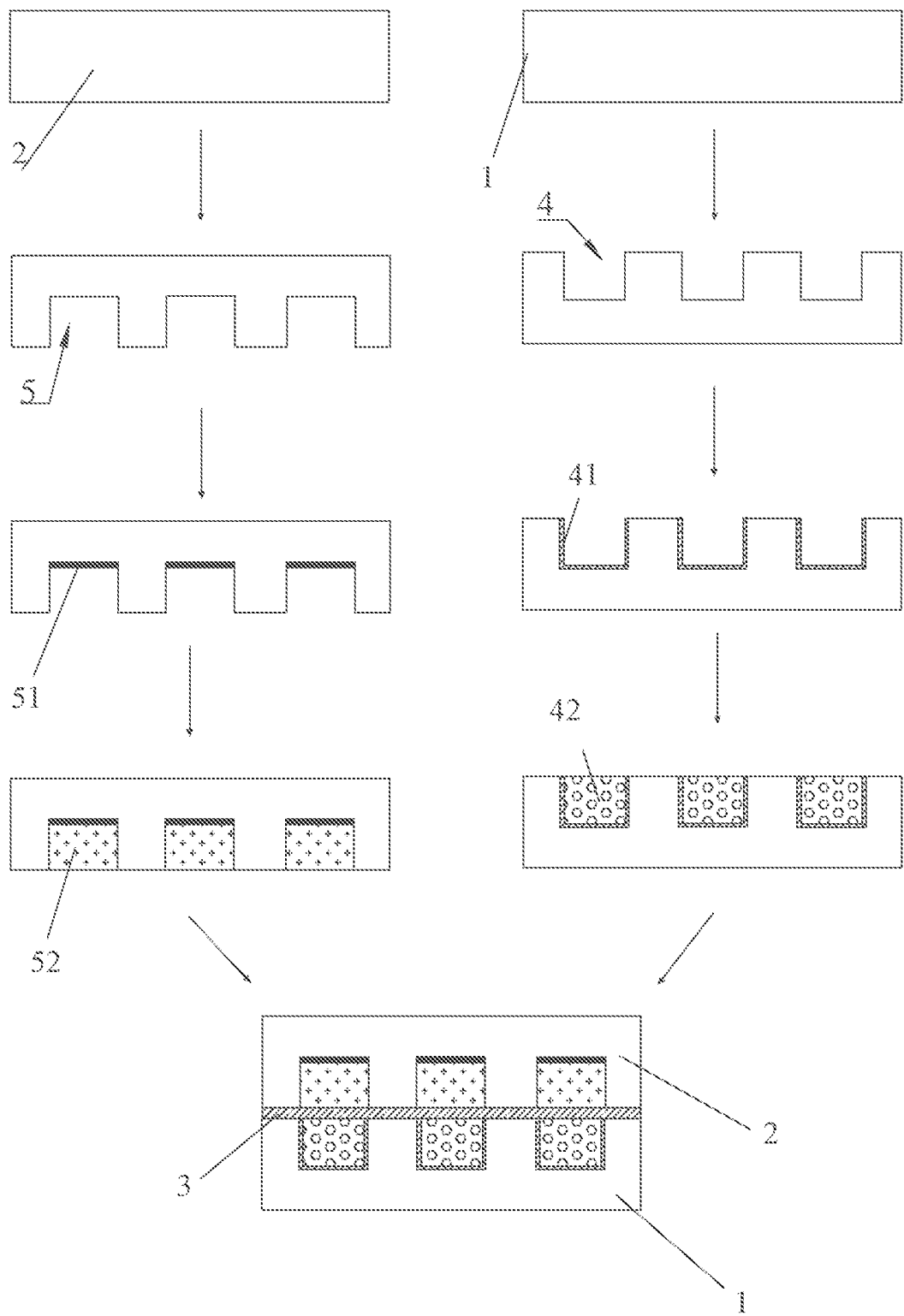
FIG. 6 is a schematic diagram of a manufacturing process of a quantum dot light guide module according to an embodiment of the present invention.
Figure 7:
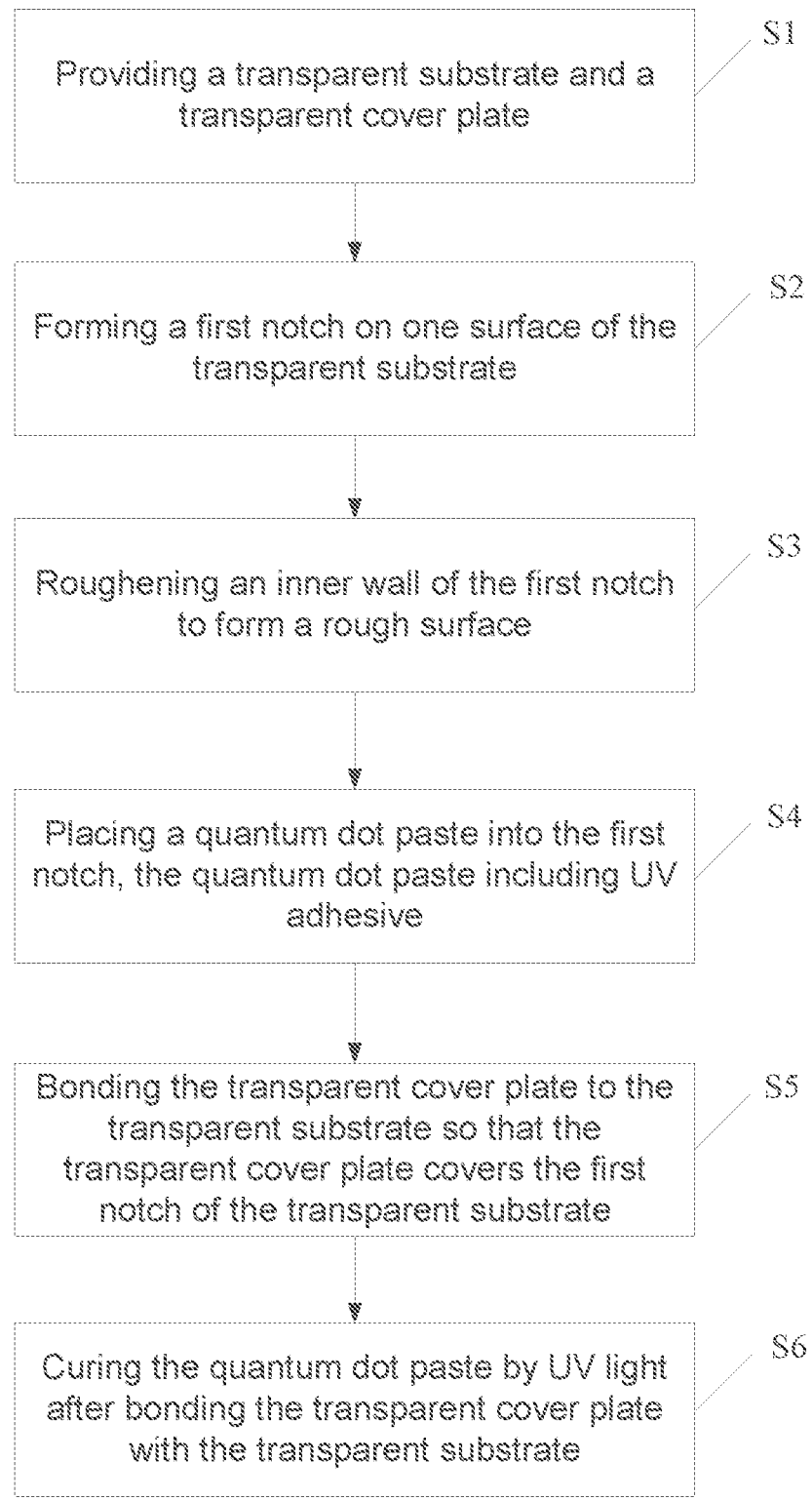
FIG. 7 is a flowchart of a manufacturing method of a quantum dot light guide module according to an embodiment of the present invention.

Referring to FIGS. 6 and 7, the present invention further provides a manufacturing method of a quantum dot light guide module, including the following steps:

S1, providing a transparent substrate 1 and a transparent cover plate 2;

S2, forming a first groove 4 on one surface of the transparent substrate 1;

S3, roughening an inner wall of the first groove 4 to form a rough surface 41;

S4, placing a quantum dot paste into the first groove 4, the quantum dot paste including UV adhesive;

S5, bonding the transparent cover plate 2 to the transparent substrate 1 so that the transparent cover plate 2 covers the first groove 4 of the transparent substrate 1; and S6, curing the quantum dot paste by UV light after bonding the transparent cover plate 2 with the transparent substrate 1.

The quantum dot light guide module manufactured by the present method can avoid water vapor and oxygen entering the quantum dot layer, and effectively avoid the failure problem of the quantum dot layer, and further make the cured quantum dot layer evenly spread in the first groove.

Specifically, the transparent substrate 1 is made of glass. Step S2 specifically includes making a mask on one side surface of the transparent substrate 1, and hollowing out the mask corresponding to the position where the first groove 4 is to be formed; then pouring hydrofluoric acid on the hollow to etch the transparent substrate 1 to form the first groove 4. The mask is to be removed before performing Step S5.

Specifically, before Step S5, the method further include:

forming a second groove 5 on the surface of the transparent cover plate 2 which is to be covered the transparent substrate 1, so that the second groove 5 is located at the position corresponding the first groove 4; and coating a film on a bottom wall of the second groove 5 to form a selective reflection layer 51.

Specifically, the transparent cover plate 2 is made of glass. A mask is made on the surface of the transparent substrate 1, and the mask is hollowed out at the position where the second groove 5 is to be formed. Then hydrofluoric acid is poured into the hollow to etch the transparent substrate 1 to form the second groove 5. Magnetron sputtering process may be used for the coating. The mask is to be removed after the coating is completed.

Further, after step of coating a film on a bottom wall of the second groove 5 to form a selective reflection layer 51, the method further includes:
placing a diffused particle paste in the second groove 5 and curing the diffused particle paste to form the diffusion layer 52.

Specifically, the diffused particle paste may also include UV adhesive, and the diffused particle paste may be cured by UV light to form the diffusion layer 52.

It is understandable that, steps of placing the diffused particle paste in the second groove 5 and placing the quantum dot paste in the first groove 4 may be completed by scraping process, that is, pouring the quantum dot paste on the transparent substrate 1, and scraping the quantum dot paste into the first groove 4; pouring the diffused particle paste on the transparent cover plate 2, and scraping the diffused particle paste into the second groove 5. In the scraping process, the residual paste can be attached to the transparent cover plate 2 and transparent substrate 1, so that the transparent cover plate 2 is bonded with the transparent substrate 1 by means of the residual paste, and then the paste is cured by UV light irradiation to form the sealing adhesive layer 3.

In some embodiments, the diffused particle paste placed in the second groove 5 and the quantum dot paste placed in the first groove 4 may be cured by UV light irradiation, and then UV adhesive is coated on the transparent substrate 1 or the transparent cover plate 2, so that the transparent substrate 1 and transparent cover plate 2 are bonded together, and finally the UV adhesive is cured by the UV light irradiation to form the sealing adhesive layer 3.

The above-mentioned embodiments only denote several embodiments of the present application, and the descriptions thereof are relatively specific and detailed, but should not be construed as limiting the scope of the patent application. It should be pointed out that for those skilled in the art, several modifications and improvements can be made without departing from the concept of the present application, which all belong to the protection scope of the present application. Therefore, the scope of protection of the patent of the present application shall be subject to the appended claims.

What is claimed is:

1. A manufacturing method of a quantum dot light guide module, comprising:
providing a transparent substrate and a transparent cover plate;
forming a first groove on one surface of the transparent substrate;
roughening an inner wall of the first groove to form a rough surface;
placing a quantum dot paste into the first groove, the quantum dot paste including UV adhesive;
bonding the transparent cover plate to the transparent substrate so that the transparent cover plate covers the first groove of the transparent substrate; and
curing the quantum dot paste by UV light after bonding the transparent cover plate with the transparent substrate,
before bonding the transparent cover plate to the transparent substrate so that the transparent cover plate covers the first groove of the transparent substrate, further comprising:
forming a second groove on a surface of the transparent cover plate which is to be covered the transparent substrate, so that the second groove is located at a position corresponding the first groove; and
coating a film on a bottom wall of the second groove to form a selective reflection layer.

2. The manufacturing method according to claim 1, after coating a film on a bottom wall of the second groove to form a selective reflection layer, further comprising:
placing a diffused particle paste in the second groove.

\* \* \* \* \*